April 1, 1930.   J. BRAUNSTEIN-LOSKANT   1,753,053
APPARATUS FOR LEARNING CORRECT BOW WORK FOR STRINGED INSTRUMENTS Filed Feb. 2, 1929

INVENTOR
J. Braunstein Loskant

BY Langner, Parry, Card & Langner
ATTYS.

Patented Apr. 1, 1930

1,753,053

UNITED STATES PATENT OFFICE

JOSEPH BRAUNSTEIN-LOSKANT, OF BASEL, SWITZERLAND

APPARATUS FOR LEARNING CORRECT BOW WORK FOR STRINGED INSTRUMENTS

Application filed February 2, 1929, Serial No. 337,046, and in Switzerland March 3, 1928.

The present invention relates to an apparatus for learning correct bow work for stringed musical instruments.

For learning correct bow work for stringed instruments it is known to provide two separated members on the string holder and on the finger board to limit the breadth of the string path of the bow. This invention is intended for the same purpose but it attains it by means of a single guiding piece. According to this invention a guide bridge member (a "mute" bridge) is applied to the back or belly of a stringed instrument, which is provided on the one hand with deep longitudinally grooves for the strings when being adapted on the belly and on the other hand in the ribs between said grooves with notches situated in the same transverse line above the bottom of said grooves so as to constitute a transverse guide path for the bow running at right angles to the strings, in order to compel the pupil by means of the guide path to guide the bow correctly as a matter of habit.

The accompanying drawing shows a constructional example of the invention, which is illustrated for example as applied to violins.

Figure 1:
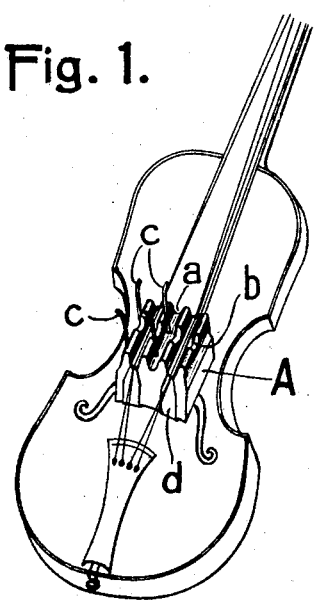
Figure 1 shows the device in perspective view applied to the belly of a violin.
Figure 2:
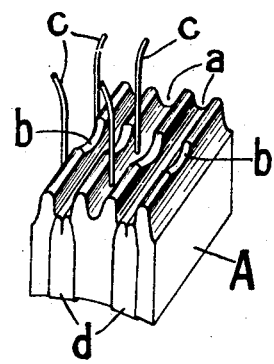
Figure 2 illustrates in perspective view the guide bridge member alone.

In the example shown in Figures 1 and 2 of the drawing a bridge member ("mute" bridge) A is substituted for the usual bridge. This bridge member is provided on its upper surface with deep longitudinal grooves $a$ through which the strings pass. The ribs left between these grooves have notches $b$ formed in them along a transverse line situated above the bottom of the grooves $a$ so as to constitute a straight transverse path for the bow at right angles to the strings. The pupil is compelled to draw the bow backwards and forwards along this bow path and thus learns correct bow work and hand position. In this case the bow does not touch the strings which are sunk in the grooves $a$ and therefore no sound is emitted.

For ensuring the guiding of the bow, pairs of projecting guide pins $c$ can be inserted in the bridge member A which limit the guide path. The pins $c$ may be removable and may also be adjustable on the bridge member so that the path can be adjusted as desired. The bridge member A is held on the belly B of the violin casing by the tension of the strings and may be rendered stable by means of rubber insertion pieces $d$.

The object of the "mute" bridge A is thus to accustom the pupil to the correct method of holding the bow and to the various arm and wrist movements before the first lesson on a violin with an ordinary bridge. Because this can be done without the unpleasant discords which would occur with an instrument having an ordinary bridge, the pupil can devote his whole attention to learning the method of holding the bow and the various arm movements.

The violin bow at first can be replaced by a round wooden rod which instead of having a butt at the lower end is provided with a depression for a finger grip, and which enables the arm and hand movements to be learned on the "mute" bridge. Later on an ordinary violin bow can be used.

The apparatus can be used of course not only with violins, but also with any other stringed musical instrument for which a bow is used, such as viols and cellos. It can also be applied to the back of the instrument. The bridge member A is preferably formed of wood, but can be made of any other convenient substance.

What I claim is:

1. An apparatus for learning correct bow work for stringed musical instruments, consisting of a single bridge member to be adapted on the belly thereof, having deep longitudinal grooves for the strings and ribs between said grooves and in the ribs between said grooves notches situated in the same transverse line above the bottom of said grooves so as to constitute a transverse guide path for the bow running at right angle to the strings, in order to compel the pupil to guide the bow correctly.

2. An apparatus for learning correct bow work for stringed musical instruments, consisting of a single bridge member to be adapted on the belly thereof, having deep longitudinal grooves for the strings and ribs between said grooves and in the ribs between said grooves, notches situated in the same transverse line above the bottom of said grooves so as to constitute a transverse guide path for the bow running at right angle to the strings, projecting guide pins being mounted on said bridge member on both sides of the transverse guide path thereof to ensure guiding of the bow.

In witness whereof I have hereunto signed my name this 10th day of January 1929.

JOSEPH BRAUNSTEIN-LOSKANT.